(12) United States Patent
Kampichler et al.

(10) Patent No.: US 6,446,542 B1
(45) Date of Patent: Sep. 10, 2002

(54) PISTON UNIT

(75) Inventors: Guenter Kampichler, Ruhstorf; Erich Eder, Vornbach, both of (DE)

(73) Assignee: Motorenfabrik Hatz GmbH & Co. KG, Ruhstorf (DE)

( * ) Notice: Subject to any disclaimer, the term of this patent is extended or adjusted under 35 U.S.C. 154(b) by 0 days.

(21) Appl. No.: 09/574,304

(22) Filed: May 19, 2000

Related U.S. Application Data

(63) Continuation of application No. PCT/EP98/07625, filed on Nov. 27, 1998.

(30) Foreign Application Priority Data

Nov. 28, 1997 (DE) .......................................... 197 52 764

(51) Int. Cl.[7] ................................................. F01B 31/10
(52) U.S. Cl. ............................................ 92/157; 92/191
(58) Field of Search ........................... 92/191, 187, 157

(56) References Cited

U.S. PATENT DOCUMENTS

| 1,789,840 A | 1/1931 | Rathbun |
| 1,810,423 A | 6/1931 | Hatch |
| 5,307,732 A | 5/1994 | Berlinger |

FOREIGN PATENT DOCUMENTS

| AT | 340205 | 12/1977 |
| DE | 2147551 | 3/1973 |
| DE | 3235220 A1 | 12/1983 |
| DE | 3813029 A1 | 11/1989 |
| DE | 3822457 C1 | 1/1990 |
| GB | 333753 | 8/1930 |
| GB | 2163520 A | 2/1986 |
| WO | WO 94/28297 | 12/1994 |

*Primary Examiner*—Edward K. Look
*Assistant Examiner*—Igor Kershteyn
(74) *Attorney, Agent, or Firm*—Katten Muchin Zavis Rosenman

(57) ABSTRACT

A device for pivotal connection of piston (1) and connecting rod (10) in a reciprocating-piston engine comprises a connecting member (6) integral with the piston, with a bearing surface (9) for a connecting-rod eye (11), which together with the bearing surface (9) forms the pivot bearing of the connecting rod (10) on the piston side; the connecting member (6) is provided at least in the region of the bolting with planar contact faces (7), which together with mating faces (8) on the inside of the piston form a common dividing plane (13); the connecting member (6) is fixed on the side of the piston (1) facing away from the combustion chamber by means of one or more connecting bolts (4) passed through bores in the piston head (2); the bearing surface (9) is much broader toward the straight portion (10) of the connecting rod than on its side facing the piston (10).

8 Claims, 3 Drawing Sheets

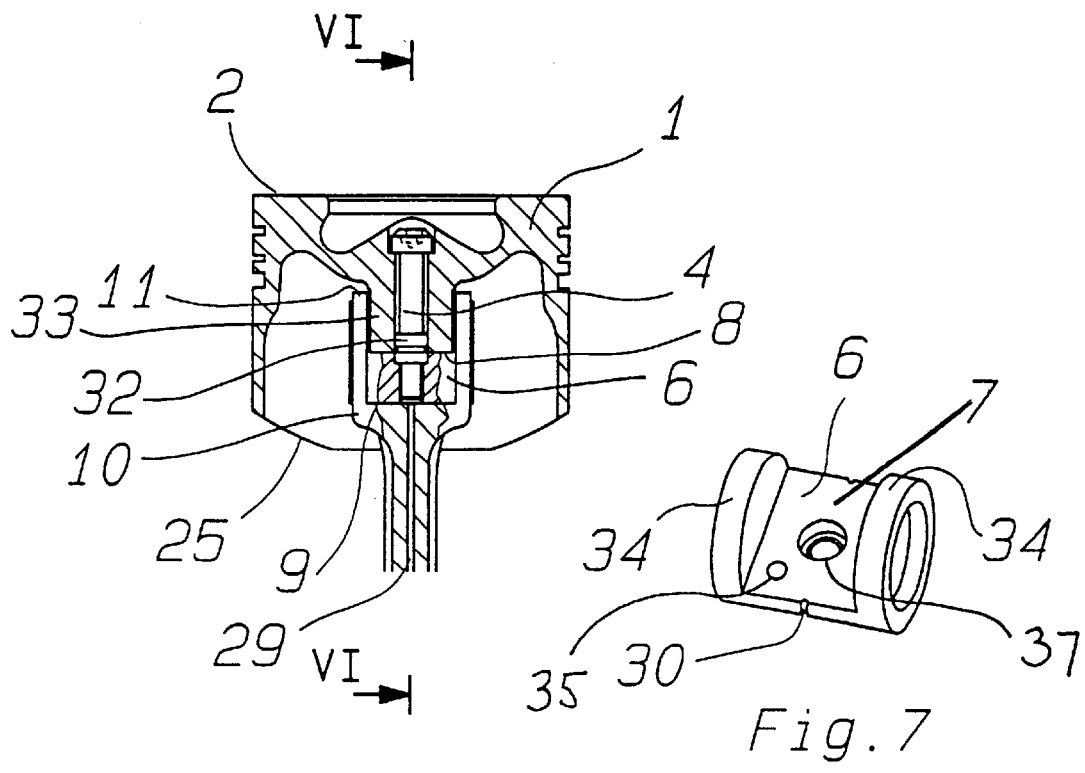
Fig. 5
Fig. 7
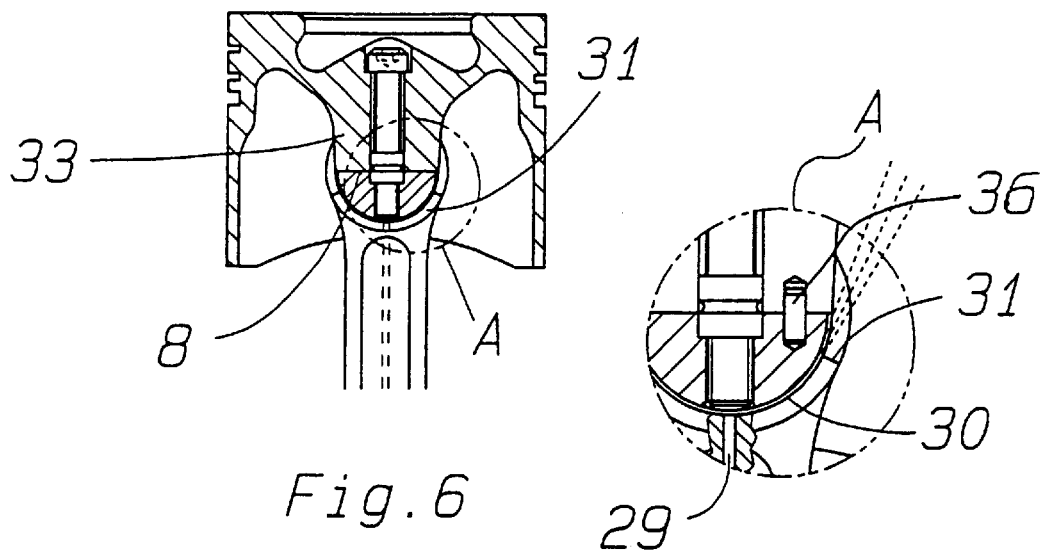
Fig. 6
Fig. 8

PISTON UNIT

This is a continuation of PCT application Ser. No. PCT/EP98/07625 filed on Nov. 27, 1998.

The invention relates to a device according to the preamble of claim 1.

In pistons of internal combustion engines, a piston pin is usually mounted pivotally in appropriate lateral piston-pin bores in the piston on the underside of the piston head.

A piston pin mounted in this way is subjected to the undiminished bending stresses and strains of the forces generated by combustion in the combustion chamber and transmitted by the connecting rod. Accordingly, close tolerances must be maintained during production of the piston-pin mount, both during manufacture of the piston pin and from the viewpoint of the piston-pin bores. During assembly or subsequent removal of the piston for maintenance or repair, the piston can be inserted into the cylinder or withdrawn therefrom only together with the connecting rod, thus necessitating detachment of the oil pan. Only then can the lower connecting-rod bearing shell be removed. Assembly of the piston unit therefore requires extensive dismantling of the engine, and in this connection removal of the cylinder head is always indispensable.

In a known oscillating-shank piston (AT 340205), the piston pin is provided with lateral flattened areas, which are used as contact faces in order to bolt it together with the underside of the piston head. Laterally projecting bearing ends of the piston pin are mounted in corresponding piston-pin bores of the shank part of the reciprocating piston. The piston head is thus subjected to bending stress and strain in the normal manner. Since the piston pin has larger diameter in the region of its middle part than in the region of its lateral bearing surface the piston-pin bores are enlarged in the manner of oblong holes, in order to permit assembly of the piston pin.

In another known piston design (U.S. Pat. No. 5,307,732), a connecting member fixed inside the piston skirt is constructed in the manner of a shortened piston pin, which is accommodated on both sides in bearing shells on the underside of the piston head and bolted there. Such shell-like contact faces between connecting member and piston necessitate a relatively high manufacturing expense. This disadvantage is also found in another known piston design (DE 3235220), in which a further piston part is fixed inside the piston skirt, in which the connecting-rod bearing is disposed. To assemble the piston pin on which the connecting-rod eye is mounted, it is necessary to subdivide the internal piston part once more. Bolting guided through the piston head is used to fix these piston parts.

According to WO A 94/28297, finally, there is known a piston/connecting-rod unit which is provided with a connecting member integral with the piston having a surface for a connecting-rod eye, the connecting member being bolted together with the piston on the side thereof facing away from the combustion chamber, and the bearing surface being much broader at the straight portion of the connecting rod than at its side facing the piston. The piston comprises two parts, such that a piston skirt can be fixed together with a piston head by bolting between the latter and the connecting member. The connecting member has substantially cylindrical form and is braced with its upper circumferential face against a corresponding hollow shape in the underside of the piston head. This can indeed be removed upward in order to replace the piston rings; this is not true, however, for the piston skirt, which is joined via the connecting member to the connecting rod, in that it engages with its opposite end in piston-pin bores of the piston skirt. As a result of this lateral mount of the connecting member, it is subjected not only to tensile but also to bending stress and strain by the forces exerted by the piston.

Even in the embodiment of a piston unit of the same class according to GB A 2163520, the connecting member is so long that upward removal of the connecting rod is not possible when the bolting between the piston head and the connecting member is loosened. Annularly circumferential planar contact faces are provided in the bolting regions between the underside of the piston head and the connecting member, so that the piston skirt and a circumferential seal can be fixed by clamping in the bolting region. Since the bolts are seated in the lateral ends of the connecting member, and thus are disposed well outside the connecting-rod eye, the connecting member is subjected to bending stress and strain.

BRIEF SUMMARY OF THE INVENTION

In contrast, the object of the present invention is to simplify the assembly/disassembly of piston and connecting rod and to provide between the straight portion of the connecting rod and the piston a connecting member which is suitable for permitting optimal dissipation of bending forces to the connecting member as a result of the forces exerted by the piston.

This object is achieved according to the invention in a device of the type-cited in the introduction, in the manner described in the body of claim 1.

Thus there is provided a reciprocating-piston engine with dividing planes between cylinder-head cover and cylinder as well as cylinder and crankcase, in which the usual piston pin is replaced by a connecting member which is bolted together with the piston on its side facing away from the combustion chamber and is provided with a bearing point for a connecting-rod eye as the piston-side pivotal bearing of the connecting rod, the connecting member being provided at least in the region of the bolting with planar contact faces, which form together with mating faces on the inside of the piston a common dividing plane, and that the connecting member is fixed by means of one or more connecting bolts passed through bores in the piston head. According to the invention, the bearing point is much broader toward the straight portion of the connecting rod than on its side facing the piston, the piston has one-piece construction and the connecting member is fixed in such a way inside the piston skirt that piston and connecting member can be removed through the cylinder opening on the cylinder-head side once the connecting bolts have been loosened.

In a one-piece embodiment of the bearing surface on the piston side, the connecting member is provided with two lateral contact faces, each adjoining the dividing plane, between which there is disposed the bearing surface on the piston side. In a split form of the bearing surface on the piston side, the connecting member has a central contact face, which adjoins the dividing plane and is disposed between two lateral bearing surface on the piston side. In both cases, the bearing surface on the piston side is much narrower than the bearing point directed toward the straight portion of the connecting rod, meaning that there is formed a stepped connecting rod with a narrow connecting-rod eye on the piston side and a comparatively much broader connecting-rod eye on the side of the straight portion of the connecting rod. In this way there is achieved optimal dissipation of bending forces to the connecting member by virtue of the forces exerted by the piston. With centrally disposed dividing plane and lateral bearing surface there exists practically zero bending load, because the connecting member does not project beyond the hole in the connecting rod, and so the firing forces are transmitted directly through the connecting member into the straight portion of the connecting rod. In this way loading of any kind is kept away from the piston skirt, and thus deformation of the piston skirt does not have to be feared. The piston can therefore be constructed on the whole in a particularly light and thin-walled form, meaning that the piston skirt can have correspondingly smaller structure. On the whole, a reduction of up to 50% compared with conventional embodiments can be achieved in the oscillating piston mass relative to the piston/connecting rod unit.

Once the cylinder head is removed, the connecting bolts, which are passed through bores in the piston head, become freely accessible from there. Preferably the bolt heads of these connecting bolts are countersunk in the head, for example in a head depression of the piston head. After the bolts have been loosened, the piston can be lifted upward, after which the connecting member can be removed, thus making the end (connecting-rod eye) of the straight portion of the connecting rod remote from the crankshaft freely accessible. The bearing shell of the connecting rod can then be loosened from the crankshaft very easily and in turn via the cylinder opening on the cylinder-head side. In the operation of removal of the bolts, the lower bearing cover of the connecting-rod bearing shell must be held by means of a tool, before it is removed with this tool.

Obviously the reverse procedure is followed for assembly of the connecting rod or of the piston, without the need to dismantle the engine. In other words, the oil pan does not have to be detached and the crankshaft does not have to be removed.

Regardless of the options toward simplification of assembly explained in the foregoing, the use of the connecting member according to the invention permits a reduction of manufacturing expense not merely because there is no longer any need for the expensive machining of the two lateral pin eyes in the case of a piston pin of conventional design; instead, the manufacture of the piston is further simplified to the effect that it is sufficient to bore this out centrally on the back side of the piston head, in order to create a planar face for fixing the connecting member according to the invention. Appropriate holes for the connecting bolts must be bored through the piston head, while the associated threaded bores are disposed in the connecting member.

The connecting member according to the invention is provided at least in the region of the bolting with planar contact faces, which together with mating faces on the inside of the piston form a common dividing plane. It is then expedient, for absorption of transverse forces in the region of the dividing plane, to provide straight pins that bridge it or fitted bushes that surround the connecting bolts; another option is to design the connecting bolts as close-tolerance bolts, the close-fitting portion of which then bridges the dividing plane.

According to a particularly advantageous embodiment, the device has only a single connecting bolt, which preferably is disposed at the center of the centrally disposed contact face and which is provided in the region of the dividing plane with a close-fitting extension, which is used for centering the connecting member relative to the piston. Such an embodiment permits considerable production and assembly simplification. In addition, there can be provided in the contact face an alignment pin, which together with the connecting bolt prevents the connecting member from being turned while the connecting bolt is being screwed in.

It is further expedient in this connection for a lubricating-oil bore disposed in the straight portion of the connecting rod to end at the bearing point of the connecting member on the connecting rod side, where a lubricating groove or flattened area of the surface of the bearing surface running in axial direction provides for distribution of lubricating oil.

In addition to distribution of lubricating oil in axial direction, there can also be provided a lubricating-oil groove disposed along a circumferential arc to direct sprayed oil onto the piston head. The spraying angle can be varied by increasing or decreasing the height of the shoulder of the connecting-rod eye that is axially oriented in the region of the bearing surface.

BRIEF DESCRIPTION OF THE DRAWINGS

The invention will be explained hereinafter with reference to several embodiments, wherein FIG. 5 shows a further embodiment with sectional plane through the longitudinal axis of the connecting member, FIG. 6 shows a section according to VII—VII of FIG. 6, FIG. 7 shows a connecting member according to FIGS. 6 and 7 in perspective view, and FIG. 8 shows a detail A according to FIG. 7.

DETAILED DESCRIPTION OF THE INVENTION

Figure 1:
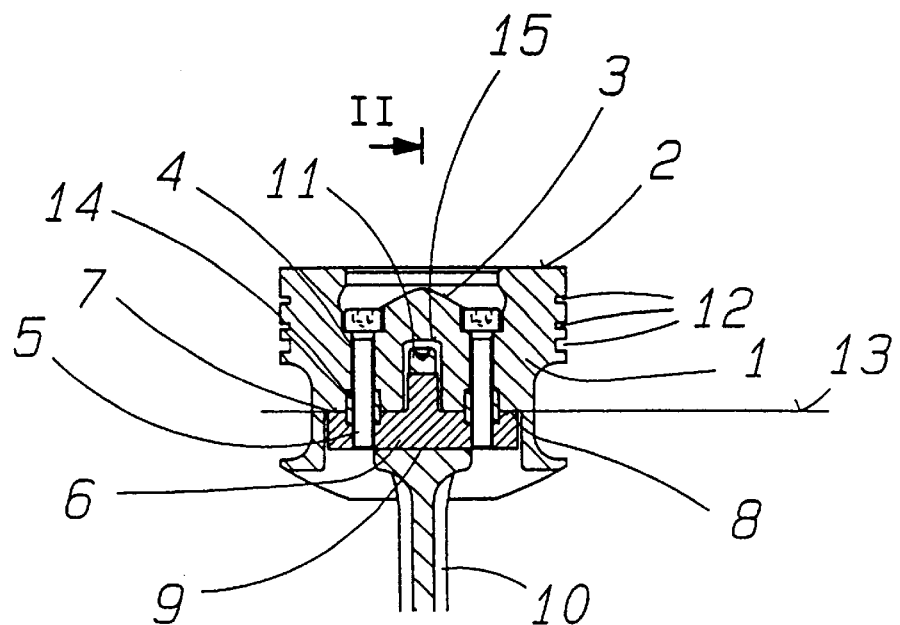
FIG. 1 shows a piston cross section through the pivot-bearing axis of the connecting rod.

FIG. 1 shows a central cross section through a piston 1 of a reciprocating-piston internal combustion engine. Piston head 2 has at its center a depression 3, which favors the course of combustion. Inside depression 3 there are disposed bores, in which there are accommodated connecting bolts 4, whose threaded portions 5 are seated in threaded bores of a connecting member 6. Connecting member 6 is fixed in this way to the inside of piston 1 facing away from piston head 2. It is braced with a plane contact face 7 against a corresponding mating face 8 of piston 1. Connecting member 6 has in its middle portion a bearing point 9, around which connecting rod 10 with its bearing eye 11 is pivotally mounted.

Connecting rod eye 11 and thus bearing surface 9 have relatively narrow structure in the region of an upper segment, whereas the region of the lower segment is broad relative thereto, so that it bridges almost the entire distance between the two connecting bolts 4. In a connecting member 6 designed according to FIG. 3, the broadened connecting-rod segment can also extend beyond the bolt holes, so that any bending stress and strain on the connecting member is precluded. This embodiment obviously requires that the bolt heads of the connecting bolts be seated in the piston head, or in other words that the direction in which the connecting bolts are screwed in is toward the crankshaft. In the circumferential region of piston 1 there are indicated grooves 12 for accommodating the piston rings. In the region of dividing plane 13 between connecting member 6 and piston 1 there are braced connecting bolts 4 by fitted bushes 14, which serve to dissipate transverse forces. Around the upper segment of connecting-rod eye 11 the piston has a corresponding recess 15.

Figure 2:
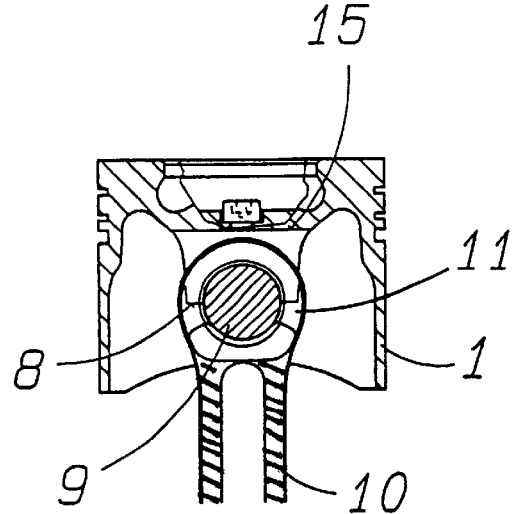
FIG. 2 shows a section according to II—II of FIG. 1 through the piston axis of the piston illustrated in FIG. 1 and perpendicular to the pivot-bearing axis of the connecting rod.

FIG. 2 shows a cross section through the pivot axis of connecting rod 10. Its connecting-rod eye 11 is mounted on bearing surface 9 of connecting member 6. It also shows mating face 8 of piston 1, against which lateral contact faces 7 of connecting member 6 bear in proportion to the tensile forces exerted by connecting bolts 4.

Figure 3:
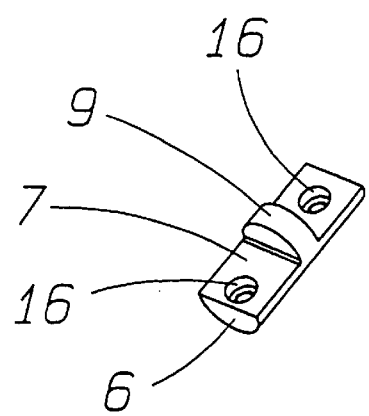
FIG. 3 shows a connecting member according to FIGS. 1 and 2 in perspective view.

FIG. 3 shows in perspective view connecting member 6 together with lateral contact faces 7 and central bearing point 9, on which the connecting-rod eye is mounted. In the region of the lateral contact faces there are disposed threaded bores 16, into which there are screwed threaded portions 5 of connecting bolts 4.

Figure 4:
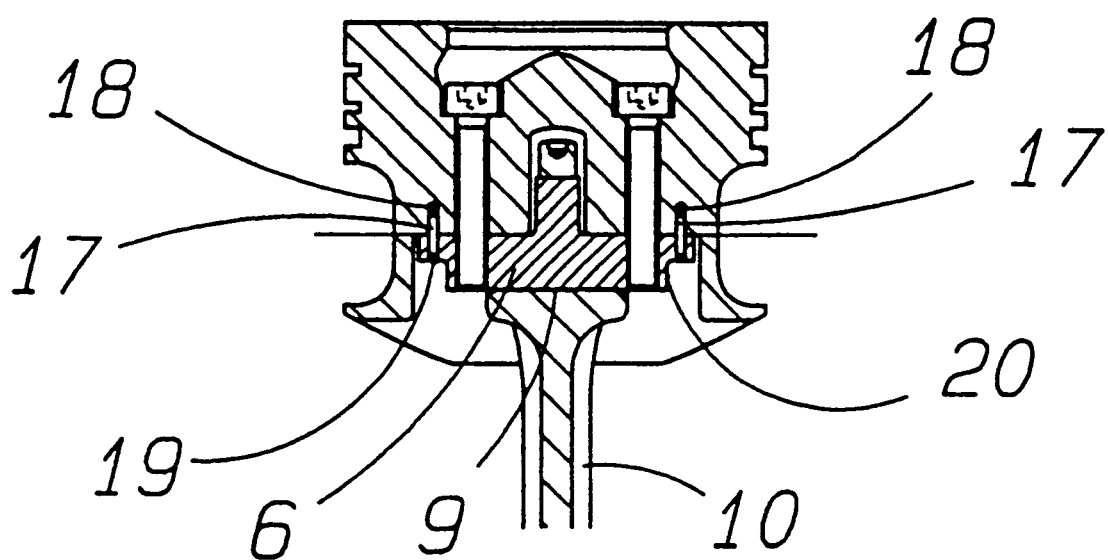
FIG. 4 shows a view according to FIG. 1 with alignment pins in addition to the connecting bolts.

FIG. 4 is distinguished from FIG. 1 by the fact that fitted bushes 14 are replaced by special plain alignment pins 17, which are accommodated partly in corresponding blind bores 18 of the piston and are seated partly in bores 19 of connecting member 6. In the region of these bores 19 the ends of connecting member 6 are made correspondingly narrower by a shoulder 20.

In the embodiment according to FIG. 5 to 8, connecting member 6 is fixed with one connecting bolt 4 disposed centrally in piston 1. Connecting bolt 4 is designed as a close-tolerance bolt, whose close-fitting extension 32 centers piston 1 and connecting member 6. Connecting member 6 is fixed to mating face 8 of an extension piece 33 projecting from the underside of piston head 2. Connecting member 6 has on the connecting-rod side a bearing surface 9, which extends over the entire width of the associated connecting-rod bearing. Two lateral connecting-rod eyes 11 of connecting rod 10 are mounted on correspondingly narrow lateral bearing points 34 of connecting member 6. Narrow lateral connecting-rod eyes 11 have the function of guiding connecting member 6 centrally in connecting rod 10 and absorbing the centrifugal forces resulting from the intake vacuum. As shown in FIG. 7, contact face 7 of connecting piece 6 has a bore 35 for an alignment pin 36, which is shown by a broken line in FIG. 8 and is inserted into a corresponding centering bore in mating face 8 of extension piece 33. When single connecting bolt 4 is screwed into threaded bore 37 of connecting member 6, alignment pin 36 provides safety against turning, or in other words it ensures precise positioning of connecting member 6 relative to extension piece 33.

Connecting rod 10 has in its longitudinal axis a centrally disposed lubricating oil duct 29. This supplies bearing surface 9 with lubricating oil. A circumferential groove 30 of connecting member 6 ensures cooling of the piston head, since its ends act as spray nozzles. The spraying angle can be varied very easily, by making shoulder 31 high or low as needed (see also FIG. 8). The appropriate flow of sprayed oil is determined by an appropriate cross section of circumferential groove 30.

By virtue of the bifurcated connecting-rod eye, the piston forces act directly on connecting rod 10 without causing bending load on connecting member 6.

What is claimed is:

1. A device for pivotal connection of a piston having a piston head and a skirt and a connecting rod in a reciprocating-piston engine, with a connection member, which is bolted together with the piston on its side facing away from a combustion chamber and which is provided with a bearing surface for a connecting-rod eye as the pivot bearing of the connecting rod on a side of the piston, the connecting member being provided at least in the region of the bolting with planar contact faces, -which together with mating faces on the inside of the piston form a common dividing plane, and the connecting member is fixed by means of one or more connecting bolts passed through bores in the piston head wherein the bearing surface is at least about twice greater toward a straight portion of the connecting rod than on its side facing the piston, in that the piston has one-piece construction and the connecting member is fixed in such a way inside the piston skirt that piston and connecting member is adapted to be removed through the cylinder opening on the side of the head of the cylinder once the connecting bolts have been loosened solely from a side of the combustion chamber.

2. A device according to claim 1, characterized in that the connecting bolts (4) are disposed in a head depression of the piston head (2).

3. A device according to claim 1, wherein at least one of straight pins that bridge it or fitted bushes that surround the connecting bolts are provided for absorption of transverse forces in the region of the dividing plane, or the connecting bolts are designed as close-tolerance bolts.

4. A device according to claim 1, characterized in that the connecting member (6) is provided with two lateral contact faces (7), each adjoining the dividing plane (13), between which there is disposed the bearing surface on the piston side.

5. A device according to claim 1, characterized in that the connecting member (6) is provided with central contact face (7), which adjoins the dividing plane (13) and is disposed between two lateral bearing surface on the piston side.

6. A device according to claim 5, characterized in that there is provided only one connecting bolt (4), which is disposed inside the contact face (7) and which is provided in the region of the dividing plane (13) with a close-fitting extension (32), which is used for centering the connecting member (6) relative to the piston (1).

7. A device according to claim 1, wherein a lubricating-oil bore disposed in the straight portion of the connecting rod ends at the bearing surface of the connecting member on the connecting rod side, where a lubricating groove or flattened area of the surface of the bearing point running in an axial direction provides for a distribution of a lubricating oil.

8. A device according to claim 7, characterized in that there is provided a lubricating-oil groove (30) disposed along a circumferential arc to direct sprayed oil onto the piston head (2).

* * * * *